April 4, 1939. W. L. BELKNAP ET AL 2,152,623
DISPLAY SIGN
Filed May 28, 1938 3 Sheets-Sheet 1
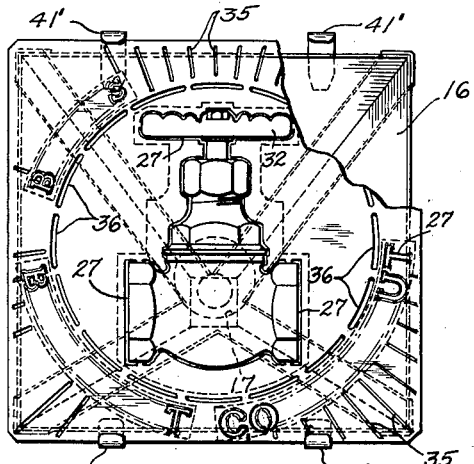
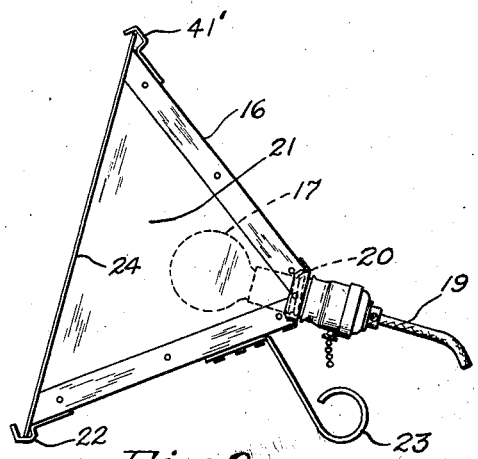
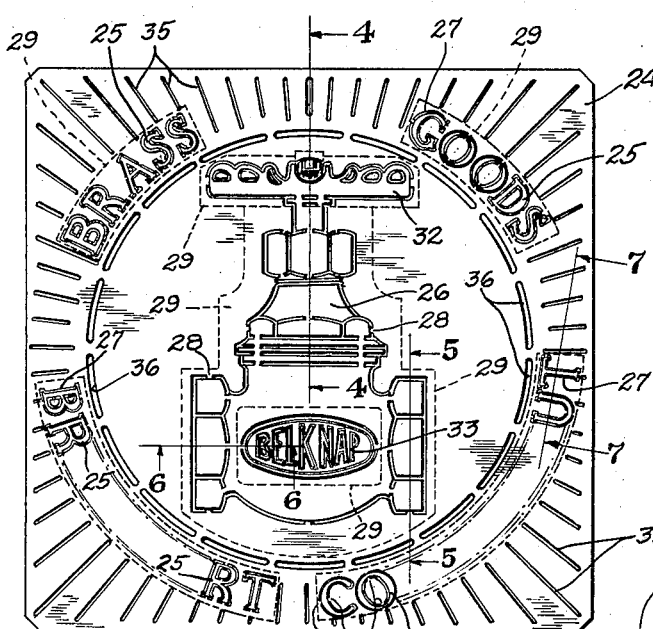
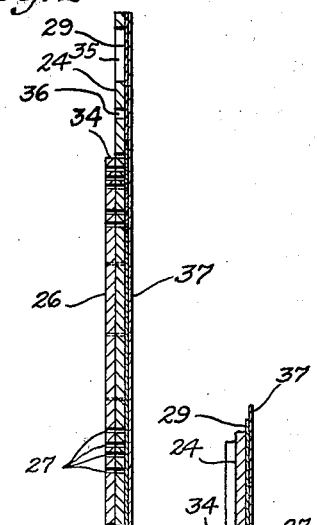
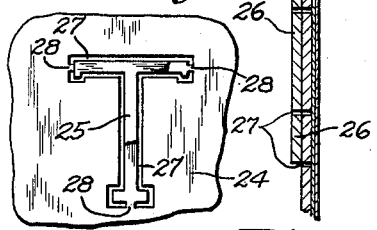
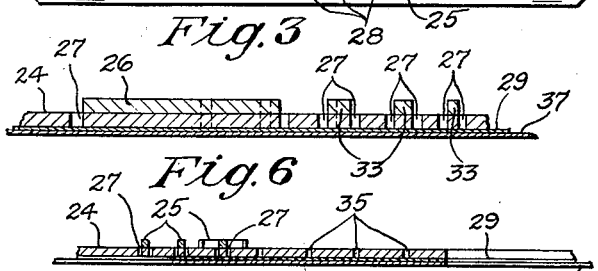
INVENTORS
William L. Belknap and
Edwin L. Meyer
By Wooster & Davis
ATTORNEYS.

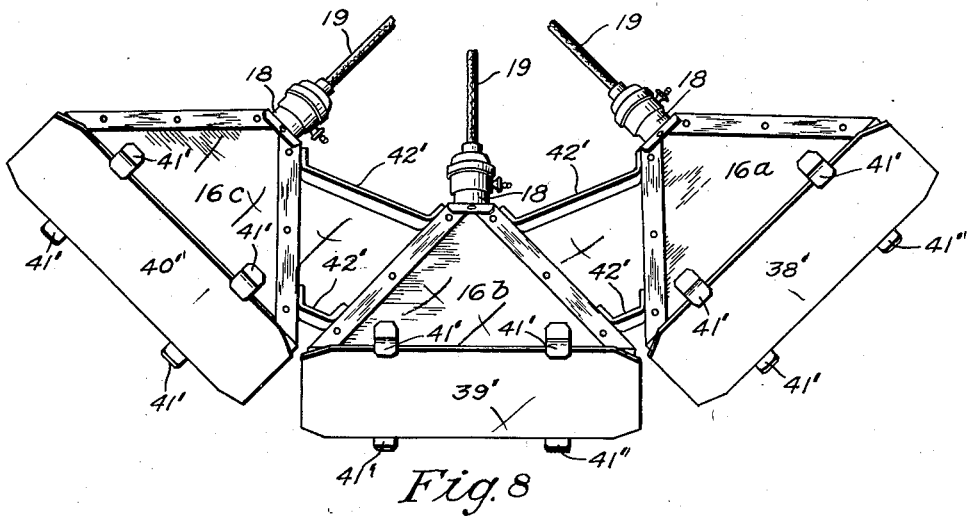
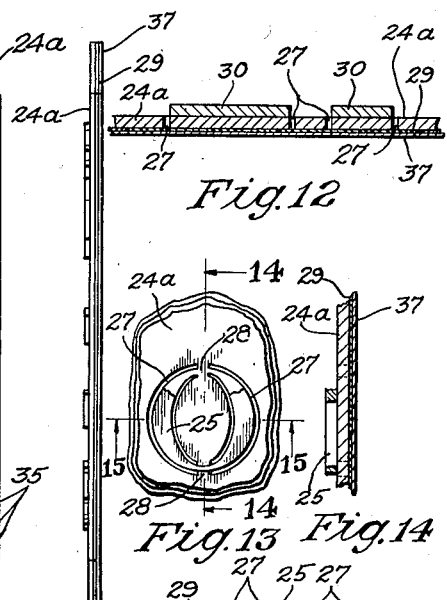
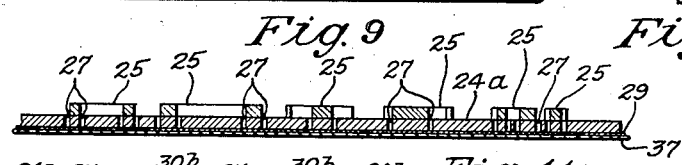
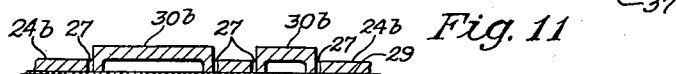

April 4, 1939.  W. L. BELKNAP ET AL  2,152,623
DISPLAY SIGN
Filed May 28, 1938   3 Sheets-Sheet 3

INVENTORS
William L. Belknap
Edwin L. Meyer
BY Wooster & Davis
ATTORNEYS.

Patented Apr. 4, 1939

2,152,623

UNITED STATES PATENT OFFICE 2,152,623

DISPLAY SIGN

William L. Belknap, Stratford, and Edwin L. Meyer, Bridgeport, Conn.

Application May 28, 1938, Serial No. 210,752

9 Claims. (Cl. 40—133)

This application is a continuation in part of our prior application Serial No. 49,940, filed November 15, 1935.

This invention relates to a display sign, and has for an object to provide a sign for display purposes which will have a new and distinctive effect so as to draw attention to it.

It is also an object of the invention to provide such a sign which can be made at low cost, and in which the display matter may be varied as desired at low cost to secure different desirable effects.

Other advantages and objects will become apparent as the description proceeds. We are, however, not limited to the specific details of construction and arrangement shown in the accompanying drawings but may use different variations and modifications within the scope of the invention.

In these drawings:

Fig. 1 is a front elevation of a sign embodying our invention;

Fig. 2 is a side elevation;

Fig. 3 is a front elevation on an enlarged scale of the sign panel of Figs. 1 and 2 showing the display matter more in detail;

Fig. 4 is a detailed section substantially on line 4—4 of Fig. 3 and on an enlarged scale;

Figure 19:
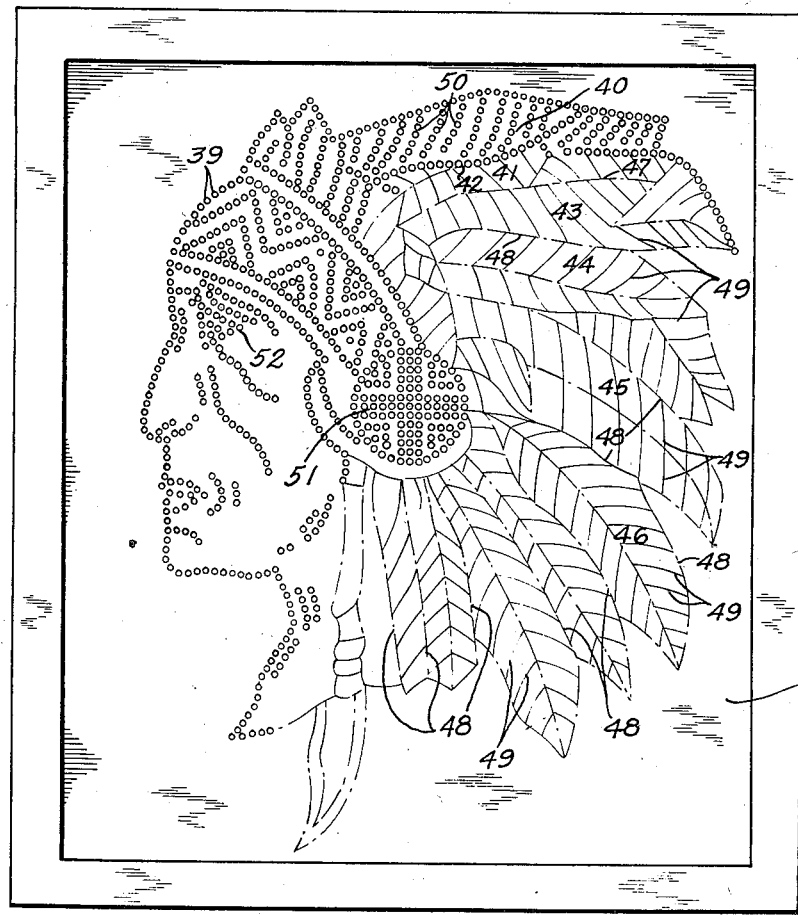
Figure 22:
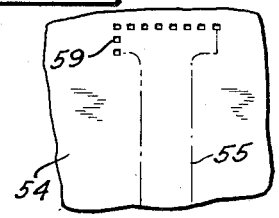
Figure 23:
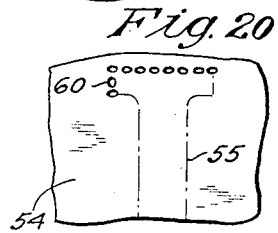
Figure 24:
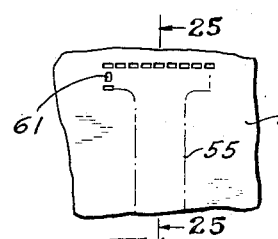
Figure 25:
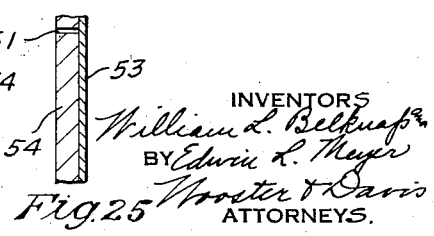

Figs. 5, 6 and 7 are similar sections substantially on lines 5—5, 6—6 and 7—7 respectively of Fig. 3;

Fig. 7a is a plan view of a character on an enlarged scale, parts being broken away to more clearly show the construction;

Fig. 8 is a plan view of a sign showing how a plurality of units may be combined;

Fig. 9 is a front view of a panel similar to Fig. 3 showing a different arrangement of the display matter;

Fig. 10 is an edge view thereof;

Fig. 11 is a section substantially on line 11—11 of Fig. 9 and on an enlarged scale;

Fig. 12 is a similar section substantially on line 12—12 of Fig. 9 and on an enlarged scale;

Fig. 13 is a detailed plan view of a single character, parts being broken away to more clearly show details;

Fig. 14 is a section substantially on line 14—14 of Fig. 13;

Fig. 15 is a similar section substantially on line 15—15 of Fig. 13;

Figs. 16 and 17 indicate slight modifications of particularly different ways in which the characters, such as designs, and letters may be formed;

Fig. 18 is a front view of a sign panel showing another modification;

Fig. 19 is a section of a portion of the panel of Fig. 18;

Figs. 20 to 24 are views of a portion of a panel and sign character showing further modifications; and Fig. 25 is a section of a portion of Fig. 24 taken substantially on line 25—25 thereof.

In display signs it is desirable that the sign be so constructed that it can be made at relatively low cost, and particularly it must have an effect that will attract attention. It is also desirable that the display matter may be readily changed to accommodate matter for changes in prices or for featuring different articles, etc.

The sign illustrated in the drawings is designed primarily for indoor advertising, particularly for use in store windows and the like, but of course may be used in other locations.

The sign illustrated comprises a holder and reflector 16, which in the present case is generally pyramidal in shape with a square or rectangular open side forming the base of the pyramid, and a suitable light source, such as an electric lamp 17, mounted in a suitable socket 18 in the apex, which socket is connected by leads 19 to any suitable source of electric current. If desired a flicker or flash element 20 may be mounted in the socket operating with a thermostat in the usual and well known manner to continuously turn the light off and on every few seconds to attract attention. The side panels 21 are tapering and on their inner surfaces are painted white to give a more uniform and brighter illumination of the display matter of the sign. This makes a very simple holder for the sign which may be set in a store window or on a counter, and it can be made at low cost. It rests on the lower edge 22 of the base and a supporting leg 23. This holder is shown merely by way of example as any other suitable type of holder may be used for our sign to hold it where it is easily visible and can be readily illuminated from the rear.

The display sign proper comprises a panel 24 preferably of suitable opaque material, such for example as wood, metal or cardboard, and on the front surface of this panel there may be mounted in one form of the device the characters such as letters or outlines of articles or any other suitable matter it is desired to have in the sign. It is not necessary, however, that the characters be raised above the surface of the panel as a greatly improved effect can be secured by having the characters painted or printed directly on the face or front surface of the panel and then the openings be cut in or through the panel. Throughout the specification and claims we have used the word "character" in the generic sense as meaning a letter, number, figure of an article, or any other element of a sign, to which attention is to be attracted. The panel 24 is preferably of cardboard as this can be provided at relatively low cost and it gives the desired effects, although other materials may be employed as desired.

In the showing of Fig. 3 this panel has a combination of characters including letters for words 25 and a figure 26 illustrating an article to be advertised, in this particular case a globe valve. In this specific form the characters are mounted on the surface of the panel and project forwardly therefrom, and preferably are of a thickness about equal to the thickness of the panel itself but not necessarily so as they may vary in thickness. They may be made of cardboard, wood or other suitable material. Each of the characters is outlined by narrow openings, in this present form comprising narrow slots 27 cut in the body of the panel so that they extend entirely through this panel, and the openings are closely adjacent the outline of the sides of the characters so that these characters are outlined by the narrow openings. The openings, however, need not be slots but may be of other shapes such for example as round, square, diamond shape, oblong or any other shape as will later be described, so long as they are sufficiently narrow to secure the desired effect. With round, square, diamond or relatively short or small openings outlining a character a series of these openings in line is used in place of the elongated slots. The slots are not continuous as there must be left tie-in portions indicated at 28 so that the characters will be supported as a part of the panel, the bases or panel part of the characters being an integral part of the panel. (Figs. 7a and 13). These openings outlining the characters should be very narrow for the best effects. Our experiments so far indicate best results with openings about $\frac{1}{32}$" wide although they may vary somewhat, but at the present time we are not prepared to say how much variation is permissible to secure the desired effect. They should be sufficiently narrow that color of the translucent material will not normally show in the openings with the sign material on the face of the panel when the sign is used for daylight visibility, but wide enough so that when illuminated from the rear of the panel it will be visible. When a raised character is used it is preferably a substantial duplicate in shape and thickness to the part of the panel of the inner section outlined by the openings, but the thickness may be varied. It is desirable that the inner edges of the narrow openings be closely adjacent, that is in alignment with the sides of the characters. The narrow openings are cut in the cardboard leaving tie bars 28 at suitable distances as shown more clearly in Figs. 1, 7a and 13, and then the characters are supported on the outlined portions which are thus integral parts of the panel. The openings may be cut in the panel and then the raised characters applied by cementing them to the surface of the panel, or the raised part of the character may be attached to the surface of the panel and then the openings cut in the panel to outline the character.

Mounted on the back of the panel over these openings is secured colored tissue paper or similar translucent material such for example as Celluloid or Cellophane, or any other suitable material for transmitting colored light through the narrow openings when the rear of the panel is illuminated. Throughout the specification and claims we employ the word "paper" in a generic sense as meaning any of these materials. This translucent material is indicated at 29 and the same piece of material may be used for a whole word so that the whole word is of a single color or a different colored material may be used for each character, or one color may be used for one portion of a character or design and other colors for other portions and so on. Thus, as shown in Fig. 9, each one of the pieces of paper 29 at the backs of the letters of the word "Dozen" may be of a color different from each of the other letters, or they may be all of the same color, or a single strip may be used for the whole word, or a certain color may be used for the words "California Oranges" and another color for the word "Sunkist", or the numbers 30 may have a translucent material 29 of one color while the arrows 31 have a material 29 of another color, and so on, and it will be obvious that the number of combinations which may be devised are numberless. The same is true of the panel in Fig. 3 in which the words 25 such as "Brass Goods" may have translucent material of one color while the handle 32 of the valve may have another color, such for example as "blue" for the material 29, while the material 29 for the body of the valve may be yellow or orange to indicate brass. Still further the trade-mark or maker's name 33 may have a backing material 29 of still another color and so on.

It has been found that when the back of the panel is illuminated the light of various colors transmitted through the translucent material passes into and through the openings outlining the characters, illuminating the side walls of the openings and the side surfaces indicated at 34 of the characters immediately forwardly of the openings. These characters may of themselves be painted of different colors but it has been found that these narrow openings with the various colored illuminations passing through from the back give a very striking effect which is difficult to describe but which to us appears to be a glow or glass like effect. The characters have the effect of depth and also a certain shine or reflection or glow effect. When the light is extinguished the sign can be read the same as any printed sign, but when the light is lighted it gives a striking glass like or glow effect although the body of the letter is black because the panel is opaque. This effect of depth and the glass or glow effect is accentuated by the thickness of the panel and the height of the characters extending above the surface thereof. The panel may also have additional openings such as 35 cut in the panel itself and having colored translucent material on the back thereof to give a sort of ray effect desired, and also there may be openings 36 in the form of circles, etc., but these do not give as much of the glass effect as is secured with characters which are raised or extend outwardly from the face of the panel and are outlined by the narrow openings. The colored pieces of translucent material 29 may be secured to the back surface of the panel by any suitable means, such as pasting it thereon, and if desired may be protected by a sheet 37 of suitable transparent material such as Celluloid or Cellopane.

As indicated above the panel of Figs. 9 to 15 is the same as that of Figs. 1 to 7 except that it has different display matter. As the material of which the panels are made is inexpensive and the sign matter may be easily cut into the panel various panels may be provided for advertising various articles and the sign may be changed as often as desired by merely removing one panel from the holder 16 and inserting another in its place. In the present device spring clips 41' are shown for that purpose.

A very effective sign can be secured by the arrangement illustrated in Fig. 8 in which more than one holder, each having a display panel, are combined. In the illustration there are three of the holders 16a, 16b and 16c each having a light for illuminating the panels 38', 39' and 40' which are like the panels 24 and 24a. By arranging the holders as shown with the panels 38' and 40' inclined at an angle say of about 45 degrees to the panel 39', if the device is located for example in a store window a person approaching along the sidewalk will be attracted by the panel 40' before he reaches the window. Directly in front of the window he will read the panel 39' and as he passes may also read the panel 38' so that various ideas and various goods may be displayed at the same time. Each box 16a, 16b and 16c will have a light for illuminating its panel and they may be tied together as a unit by suitable straps 42'.

Instead of forming the characters, such as the letters and designs, as separate members fastened to the front face of the panel or cardboard they may be formed in different ways. We have shown examples in Figs. 16 and 17. Thus as indicated in Fig. 16 the characters may be made by embossing them on the face of the panel in a press. Thus if 24b represents the panel of cardboard or other suitable material the characters 30b may be formed to extend forwardly from the face of the panel by embossing them in a press and then be outlined by the narrow slots 27 as described above. The colored translucent material 29 is used on the back of the slots the same as in the first form. It may also be protected by the transparent material 37.

In Fig. 17 is indicated another way in which the characters may be formed. Here the characters indicated at 30c are molded integrally with the panel 24c. Thus the wet cardboard fibrous material for example or papier-mâché may be molded to give the raised characters and then the narrow openings 27 cut to outline them as in the other forms. The colored translucent material 29 is also used to cover these openings and may be protected by the transparent covering 37.

In Figs. 18 and 19 is shown another way in which the characters may be formed. In these figures the opaque panel 38 is similar to the panel 24 or 24a of the first form and may be placed at the front of the holder 16 to be illuminated from the rear the same as in the other forms. In the figure or character, however, in this form, the narrow openings through the panel are in the form of small round openings 39, and it will be seen that the character or design is outlined by the circular openings the same as the narrow elongated openings of the first form. These openings are located closely adjacent and for the most part are arranged in linear series as shown. These linear series may be used not only to outline the outer confines of the figure but also may be used to outline or differentiate different portions of the body area of the figure. Thus the feather 40 is outlined or differentiated from the feather 41 by a line of openings 42. Similarly other feathers or surface areas as 43, 44, 45, 46, etc., may be differentiated by similar lines of different openings, it being understood that the light broken lines and similar continuous light lines 47, 48, 49, etc., of this figure represent rows of narrow openings, the openings not being filled in because of the extreme amount of work that would be required to fill in all the openings, and also to simplify the drawings. It is believed the part of the figure which is filled in with the series of narrow openings sufficiently illustrates the principle.

It will also be seen that not only may the lines of narrow openings be used to differentiate different surface areas in the body of the character but also that the body of any particular area may be filled in with these openings as indicated at 50, 51 and 52 so as to give a fuller lighted effect for the body of any particular area. The backs of these openings are covered with the thin colored translucent material 53 the same as in the other forms to give the different desired effects. Different surface areas may be given different colors on the front face of the panel and then the translucent material 53 at the back of this area and other areas may be given different colors to give different color effects when the panel is lighted from the rear than when lighted from the front. Thus for example the carrier 40 may be purple, the area 41 red, the area 43 orange, the area 44 green, etc., and then the translucent material 53 covering the backs of the openings in these areas may be of different colors as desired, so that the areas when illuminated from the front will give one effect or combination of colors and when illuminated from the rear, so that light passes from the rear through the openings, it will have another color effect from the combination of colors in the translucent material.

Figure 20:
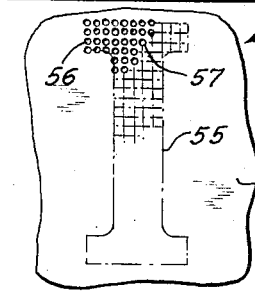

The small round openings give a very brilliant effect when the panel is lighted from the rear, and they do not detract from the visibility or effect when the panel is illuminated from the front. In fact they may be used in such a way as to add to the effect when illuminated from the front, although the openings are so narrow that the colored translucent material on the rear of the panel is not normally visible when the panel is illuminated from the front only. These narrow openings, however, need not be round but may be of other shapes, such for example as diamond shaped, square, oval or slightly longer than square, or any other shape to secure the desired effect. Thus in Figs. 18 to 24 we have illustrated a series of different shapes. In Fig. 20 the panel 54 has a character 55 thereon in the form of a letter I outlined by round openings 56. These openings, however, for simplicity of the drawings are not carried through the outline of the letter but are shown only in a small portion of it. Also, the letter may not only be outlined by these narrow openings but any portion or all of the body area may be filled in with these openings as indicated at 57.

Figure 21:
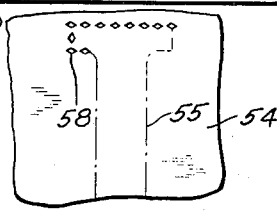

In Fig. 21 in the letter 55 the openings are of narrow diamond shape as shown at 58, and similarly as described in connection with Fig. 20 all or any part of the body area of the character may be filled in with these narrow openings.

In Fig. 22 the narrow openings as indicated at 59 outlining or filling in the character are indicated as substantially square.

In Fig. 23 the openings 60 are oval, and in Fig. 24 the openings 61 are small rectangles and a little longer in one direction than in the other, in other words are short slots. It will therefore be understood that the narrow openings may be long or short as desired and may be any one of a number of different shapes.

It has been old in display signs to outline letters or characters with slots that are illuminated from the rear, but so far as we are aware we are the first to outline these characters, especially raised characters, by means of narrow openings through an opaque panel which openings are covered at the rear of the panel by colored translucent material, such for example as colored tissue paper, or other suitable material as above mentioned whereby when the rear of the panel is illuminated we secure the new and distinguishing glass like or glow effect of the letters or characters of the display.

The principle of the novel effect obtained by this type of sign involves the provision of apertures or openings of such small size or narrowness through an opaque material of such thickness relative to the size of the apertures or openings that the colored translucent material, such for example as colored tissue paper or the like, over the back end of these openings serving as light filtering panes at the inner ends of the apertures will be virtually invisible for daylight visibility or when the panel is illuminated from the front only. This may be because of more or less shadow formed by the sidewalls of the opening and probably also because of this smallness or narrowness of the apertures the amount of light reflected from the colored translucent material is so small as compared with that from the illumination of the front surface of the panel that the translucent material in effect is practically invisible when the panel is illuminated from the front only. However, when the panel is illuminated from the rear, especially with very little or much less illumination from the front, then the effect of colored light transmitted through the openings from the back of the panel is very striking and gives a very brilliant and novel effect quite different from the effect which is secured when the panel is illuminated from the front only.

Having thus set forth the nature of our invention, what we claim is:

1. A sign comprising a sheet of cardboard having a character outlined by narrow slots through the cardboard, a raised character on the face of the cardboard resting on the inner section of the outline and of a duplicate shape thereto, said raised portion being also of substantially the same size as the inner section of the outline, and translucent colored paper covering the rear of the slots so that light from the rear of the cardboard will pass through this paper to the slots.

2. A sign comprising a sheet of cardboard having a character outlined by narrow slots extending through the cardboard and separated from each other at their ends by narrow cross bars integral with the cardboard forming supports for the inner section outlined, a duplicate section to that of the inner outlined section on the front face thereof and projecting forwardly from the face of the sheet so that light passing through the slots from the rear will illuminate the sides of the duplicate section, and thin translucent paper covering the rear sides of the slots.

3. A sign comprising an opaque panel having sign matter thereon, said sign matter embodying painted characters each projecting forwardly from the face of the panel, said panel having narrow slots therethrough outlining the characters at the edges thereof so that light passing through the slots illuminates the side walls of the characters, and thin colored translucent paper covering the rear sides of said slots so that light from the rear will pass through the paper to the slots.

4. A sign comprising an opaque panel having characters thereon contrasting with a background for daylight visibility to create an artistic effect, said characters being outlined by extremely narrow slots through the panel, and thin colored translucent paper covering the rear sides of said slots so that when the sign is illuminated for night visibility colored light from the rear will pass through the slots to create a different artistic effect, and said slots being so narrow that color of the paper will not show in the slots when the sign is used for daylight visibility.

5. A sign comprising an opaque panel having characters thereon contrasting with a background for daylight visibility to create an artistic effect, said characters being outlined by extremely narrow openings through the panel, and thin colored translucent paper covering the rear sides of said openings so that when the sign is illuminated for night visibility colored light from the rear will pass through the openings to create a different artistic effect, the said openings being so narrow that color of the paper will not show in the openings when the sign is used for daylight visibility.

6. A sign comprising an opaque panel having a character thereon contrasting with a background for daylight visibility to create an artistic effect, said character being outlined by extremely narrow openings through the panel, said openings being arranged in rows and with the openings in the rows closely adjacent, and thin colored translucent material covering the rear sides of the openings so that when the sign is illuminated from the rear colored light from the rear of the panel will pass through the openings to create a different artistic effect, the said openings being so narrow that color of the translucent material will not show in the openings when the sign is illuminated from the front only.

7. A sign comprising an opaque panel having a character thereon contrasting with a background for daylight visibility to create an artistic effect, said character being outlined by extremely narrow openings through the panel, portions of the body areas of the character being also filled in with similar narrow spaced openings, and thin colored translucent material covering the rear sides of the openings so that when the sign is illuminated from the rear colored light will pass from the rear of the panel through the openings to create a different artistic effect, the said openings being so narrow that color of the translucent material will not show in the openings when the sign is illuminated from the front only.

8. A sign comprising an opaque panel having a character thereon contrasting with a background for daylight visibility to create an artistic effect, said character being outlined by extremely narrow openings through the panel, said character including body areas within the outlines which are delineated from each other by similar narrow openings disposed in linear series, and thin colored translucent material covering the rear sides of said openings so that when the sign is illuminated from the rear colored light will pass through the openings from the rear of the panel to create a different artistic effect, the said openings being so narrow that color of the translucent material will not show in the openings when the sign is illuminated from the front only.

9. A sign comprising an opaque panel having a character thereon contrasting with a background for daylight visibility to create an artistic effect, said character being outlined by extremely narrow substantially circular openings through the panel arranged closely adjacent in linear series, and thin colored translucent material covering the rear sides of said openings so that when the sign is illuminated from the rear colored light from the rear of the panel will pass through the openings to create a different artistic effect, the said openings being so narrow that color of the translucent material will not show in the openings when the sign is illuminated from the front only.

WILLIAM L. BELKNAP.
EDWIN L. MEYER.